Dec. 15, 1931.  F. SIEPP  1,837,077
BEET HARVESTER
Filed July 12, 1930  4 Sheets-Sheet 1
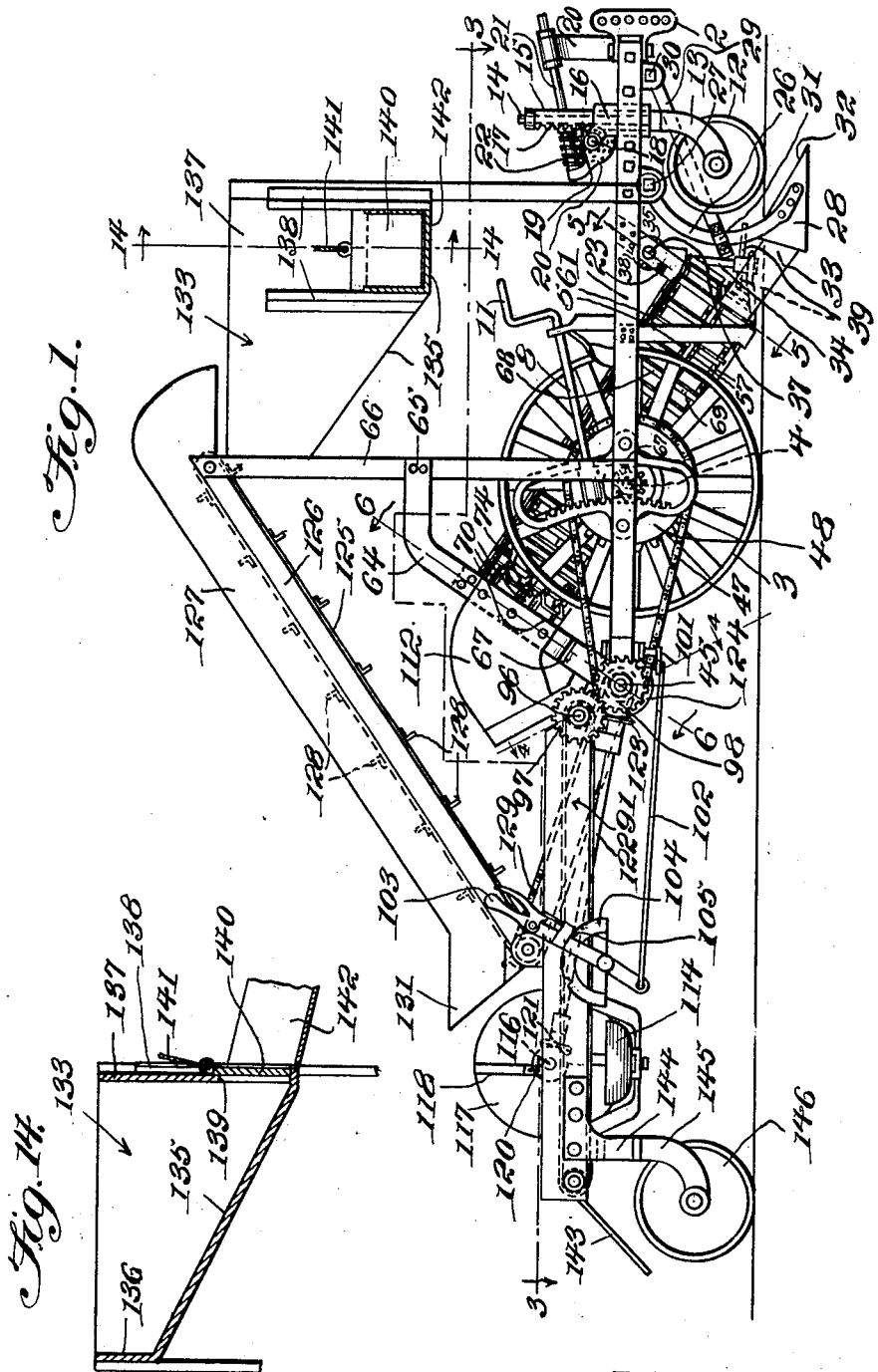
Fred Siepp
INVENTOR
BY Victor J. Evans
ATTORNEY
WITNESS: J. T. L. Wright

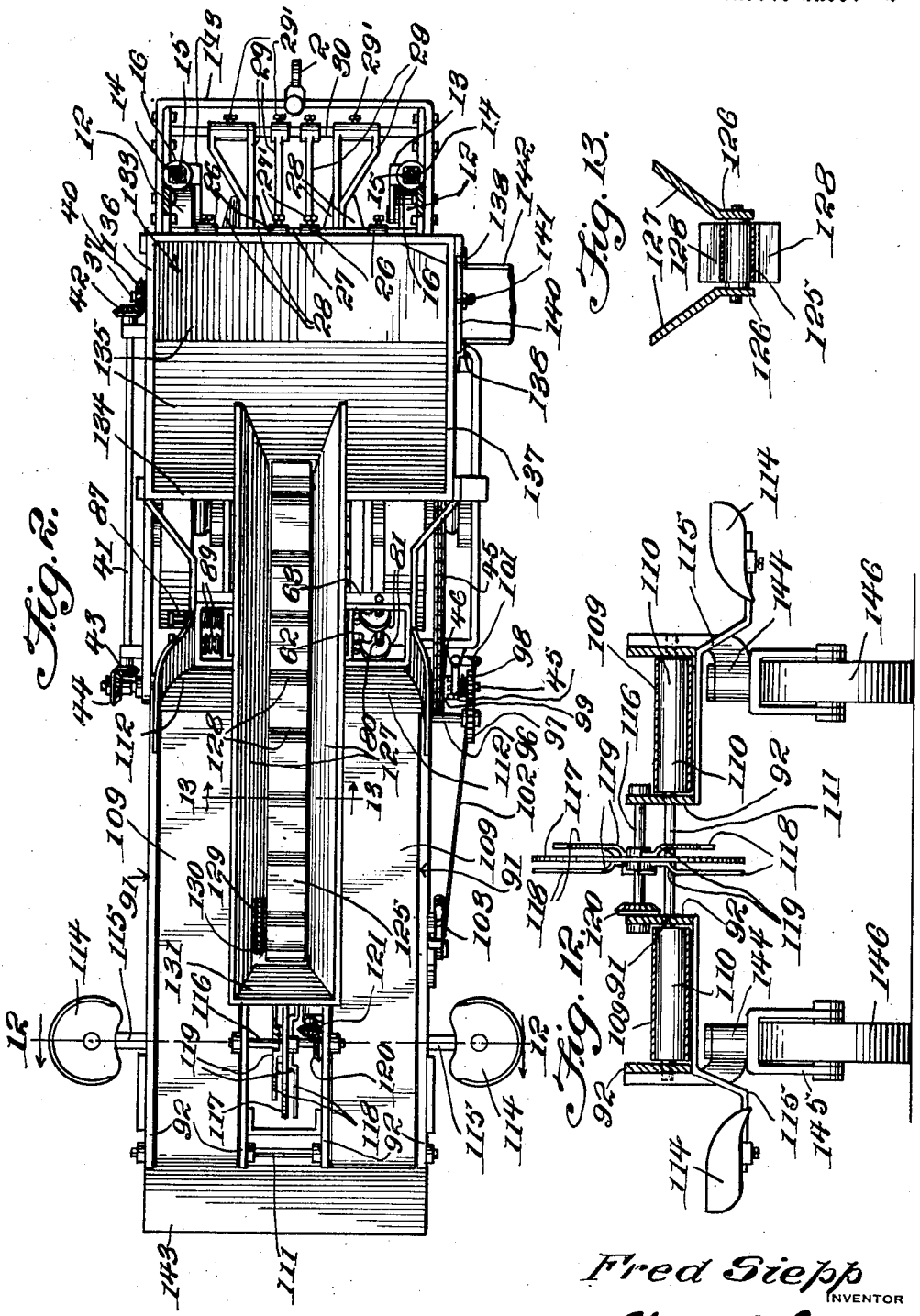

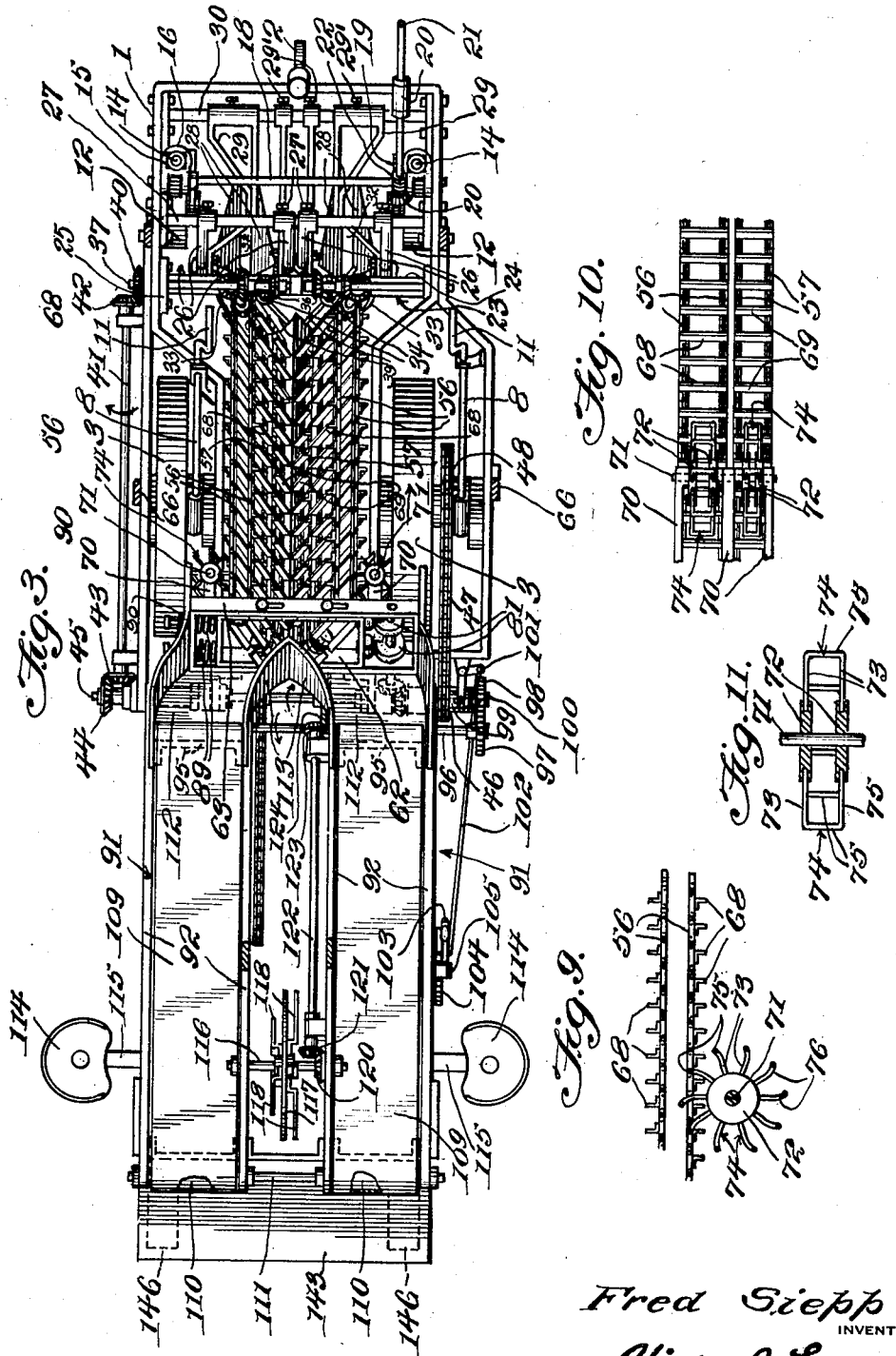

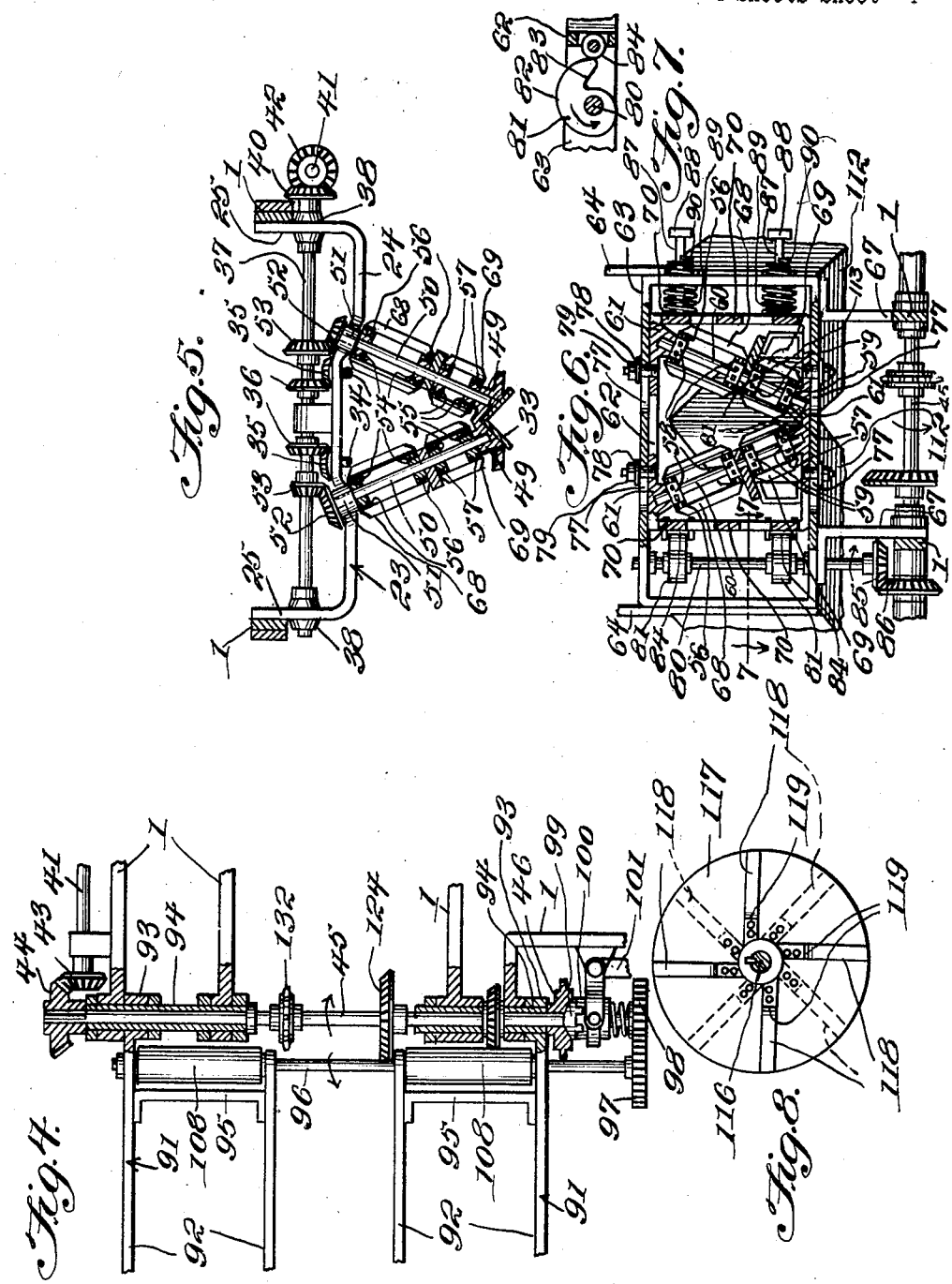

Patented Dec. 15, 1931

1,837,077

UNITED STATES PATENT OFFICE

FRED SIEPP, OF KIMBALL, NEBRASKA

BEET HARVESTER

Application filed July 12, 1930. Serial No. 467,574.

This invention relates to improvements in beet harvesters and has as its primary object to provide a beet harvester so constructed and adapted to operate in such a manner as to effect pulling of the beets from the rows in a uniform manner, cleaning the beets of accumulations of soil, topping the beets, and delivering the topped beets to a hopper from which they may be discharged into a truck or other receptacle, thus performing these various operations in succession, and automatically, and thereby expediting the harvesting and topping of the beets.

Another object of the invention is to provide a beet harvester which may be conveniently connected with any ordinary tractor and in which means is provided whereby the lifting blades for elevating the beets from the rows, may be adjusted with respect to the ground surface so as to enter the furrows at different depths and, in connection with these blades, the invention contemplates a novel construction of conveyor for conducting the beets upwardly, the invention contemplating a novel means for dislodging any soil which may be adhering to the beets, so that, when the beets are delivered to the topping mechanism of the machine, they will be cleared of all foreign matter.

Another object of the invention is to provide, in connection with the conveyor for elevating the beets after they are lifted from the furrows, novel means for clearing the endless conveyor chains of accumulations of soil or mud.

Another object of the invention is to provide means for jarring the beets conveyed by the endless conveyor so as to further insure of dislodgment of any accumulated soil therefrom.

Another object of the invention is to provide a beet topper machine, including a frame supporting the beet lifting blades and means for elevating the lifted beets, the frame having a conveyor for conducting the beets to the topping mechanism, in combination with a common drive for the two endless conveyors of such a nature that the adjustment of the first mentioned frame for the purpose of elevating and lowering the same to correspondingly adjust the lifting blades will not in any way interfere with the transmission of motion to the two endless conveyors by the means common to the two.

Another object of the invention is to provide a novel topping means which will be so constructed and operated in such a manner that in the topping of the beets, there will be no likelihood of cutting away the upper ends of the beets in a manner to render the same unfit for the market.

Another object of the invention is to provide a novel construction of combined hopper and chute into which the elevated and topped beets may be delivered and from which the beets may be delivered to a truck or the like.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:

Figure 1 is a view in side elevation of a beet harvester constructed in accordance with the present invention.

Figure 2 is a top plan view thereof.

Figure 3 is a substantially horizontal sectional view taken substantially on the line 3—3 of Figure 1, looking in the direction indicated by the arrows.

Figure 4 is a horizontal sectional view taken substantially on the line 4—4 of Figure 1, looking in the direction indicated by the arrows.

Figure 5 is a transverse sectional view, in detail, taken substantially on the line 5—5 of Figure 1, looking in the direction indicated by the arrows.

Figure 6 is a transverse sectional view taken substantially on the line 6—6 of Figure 1, looking in the direction indicated by the arrows.

Figure 7 is a detail sectional view taken substantially on the line 7—7 of Figure 6, looking in the direction indicated by the arrows.

Figure 8 is a view in side elevation of one of the beet topping units.

Figure 9 is a fragmentary view illustrating, in plan, the means provided for cleaning the endless conveyor chains which elevate the beets.

Figure 10 is a view in side elevation of the means shown in Figure 9.

Figure 11 is a detail diametric sectional view through one of the cleaners.

Figure 12 is a vertical transverse sectional view taken substantially on the line 12—12 of Figure 2, looking in the direction indicated by the arrows.

Figure 13 is a similar view on the line 13—13 of Figure 2.

Figure 14 is a vertical transverse sectional view through the receiving hopper and delivery chute.

The beet elevating and conducting means is mounted in a forward frame structure which is indicated in general by the numeral 1 and this frame structure is provided at its forward end with a clevise 2 adapting it to be connected to any ordinary tractor. The frame 1 is supported by ground wheels 3, which are rotatably mounted upon the usual axles 4, and these wheels are adjustable in the usual manner by a shaft 8 connected with the adjusting means ordinarily employed, the shaft 8 being provided with a crank handle 11 whereby the shaft may be manually rotated, and it will be understood at this point that by rotating the shaft 8, the frame 1 may be elevated or lowered with respect to the axle 4. The forward end of the frame 1 is supported by two swivel wheels 12 which are mounted in yokes 13 at the lower ends of stems 14 which turn in a square sleeve 15 slidably mounted in a square guide 16 upon the respective side member of the frame 1. The sleeve 15 is provided with a series of rack teeth 17 and a shaft 18 is mounted in rear of the sleeve upon the respective guide 16 and mounted upon this shaft is a worm pinion 19.

A bracket 20 is mounted upon the frame 1 at each side of the front thereof and a shaft 21 is mounted at the upper end of each bracket and a worm 22 is provided upon the rear end of the said shaft and this shaft is manually rotatable, through the means of a crank handle, (not shown) so that the forward end of the frame may be elevated and lowered.

The numeral 23 indicates a frame which comprises a cross piece 24 and right angular end pieces 25 which are bolted or otherwise secured to the respective side members of the frame 1, and in front of this frame, four stocks 26 are mounted upon the frame at their upper ends as indicated by the numeral 27 and a pair of lifting blades 28 are mounted upon the lower ends of these stocks, it being understood that in this manner, a pair of lifting blades are mounted at the front of the frame of the machine in rear of the wheels 12. A brace member 29 is secured at its upper end as at 30 to the respective side member of the frame 1, and at its rear end as at 31 to a respective one of the stocks 26 and in this manner the stocks and the blades carried thereby are supported beneath the forward part of the frame 1. By reference to Figure 3 it will be observed that the blades 28 of each pair have substantially parallel spaced edges 32 and these edges are extended upwardly on curved lines as shown in Figure 1 so that the roots of beets being engaged by the edges 32 of the blades will be lifted out of the furrow as the blades travel therethrough.

Guards 33 are arranged at their rear ends of the blades 28 and serve to guide the beets in an upright position to the lower end of an endless conveyor which will presently be described, and in order that the beets may be prevented from becoming displaced as they pass from the blades 28 to the conveyor, shafts 34 are journalled in the cross pieces 24 of the frame 23 and beveled pinions 35 are fixed upon the upper ends of these shafts and mesh with similar pinions 36 upon the shaft 37 which is journalled in bearings 38 upon the end pieces 25 of the frame 23. Fixed upon the lower end of each of the shafts 34 and radiating therefrom are arms 39 and these arms and the shafts supporting the same are so arranged with respect to the space between the edges 32 of the blades 28 that the arms will pass these spaces as the shafts 34 are rotated and a beveled pinion 40 is mounted upon the end of the shaft 37 and the shaft 41 is mounted beside one side member of the frame 1 and is provided upon its forward end with a beveled pinion 42 meshing with the pinion 40. A beveled pinion 43 is fixed upon the rear end of the shaft 41 and meshes with the beveled pinion 44 mounted upon a main motion transmitting shaft 45. This shaft 45 is mounted in bearings upon the side members of the frame structure 1 and a sprocket gear 46 is fixed upon the shaft and a sprocket chain 47 is trained about this gear and about a sprocket gear 48 which is fixed for rotation with one of the ground wheels 3. Mounted upon each of the guards 33 are bearings 49 in which are mounted the lower ends of shafts 50, and, as each of the guards 33 comprises two downwardly diverging and inclined portions, and the bearings are mounted each upon a respective one of these portions, the shafts 50 are relatively inclined upwardly away from each other as best shown in Figure 5 of the drawings.

The upper ends of the shaft 50 are mounted in bearings 51 which are formed or provided upon the cross member 24 of the frame 23 and a beveled pinion 52 is fixed upon the upper end of each shaft 50 and meshes with a bevel gear 53 fixed upon the shaft 37 and at this point, and particularly by reference to Figure 5, it will be observed that the pinion 52 upon the upper end of one of the shafts 50, is of less diameter than the companion pinion 53 upon the shaft 37 whereas, in the instance of the other shaft 50, the pinion 52 at the upper end of this shaft is of greater diameter than the pinion 53 upon the shaft 37. Therefore the first mentioned shaft 50 will be rotated at a greater rate of speed than the last mentioned shaft 50, and the purpose of thus imparting rotary motion at different speeds to these shafts will presently be made clear. Sprocket gears 54 and 55 are fixed upon each of the shafts 50 and sprocket chains 56 and 57 are trained about the gears 54 and 55 respectively.

These sprocket chains 56 and 57 are also trained about sprocket gears 58 and 59, respectively, mounted upon shafts 60 journalled in bearings 61 upon the top and bottom members of a rectangular frame 62, which frame is mounted for transverse sliding movement in a second rectangular frame 63, and this frame is mounted between brace members 64 which are secured at their upper ends as at 65 to uprights 66 which are mounted at their lower ends as at 67 upon the side members of the frame 1.

Shafts 60 are inclined with respect to each other at the same angle of inclination as the shafts 50, above described, and consequently the shaft 60 corresponding to the shaft 50 which is rotated at a higher speed than the other shaft 50 will, in its turn be rotated at a greater speed than the other shaft 60 so that the sprocket chains at one side of the two conveyor stretches will travel at different rates of speed. The sprocket chains 56 and 57 of the two endless pairs, are connected by slats 68 and 69 respectively, and these slats project outwardly with respect to the stretches of the chain. These slats 68 and 69 engage the beets, which are delivered to the elevating conveyors, and inasmuch as one conveyor stretch of each conveyor is travelling at a higher rate of speed than the other stretch and rotary motion will be imparted to the beets as they are carried upwardly through the stretches. Likewise the beets will be engaged by the slats 68 and 69 and as a consequence any soil which has accumulated on the beets will be broken up and permitted to fall to the ground surface. However, in order to prevent any clogging of the slats or the conveyor chain links with soil, there are mounted, in suitable frame members 70, at the opposite sides of the frame structure 63, shafts 71 upon each of which are fixed two disks 72 for each upper and lower conveyor stretch and mounted in the peripheries of these disks 72 are the inner ends of the side members 73 of substantially U-shaped disintegrating members 74, each of these members also comprising a transverse arcuate connecting portion 75. The said members 73 of the disintegrating members are somewhat curved at their outer end portions as indicated by the numeral 76 and, by reference to Figures 9 and 10 of the drawings, it will be observed that, as the stretches of the conveyor chains pass the disintegrating units comprising the shaft 71, the disks 72 and the members 74, the members will engage at their outer ends between the slats 68 of the said endless conveyor stretches and, as they move between the slats and enter between the same and then leave the same, any particles of soil which may have accumulated upon the slats or upon the chains, will be disintegrated and caused to drop from the chains, it being understood at this point that the shafts 71 are freely rotatably mounted and therefore the disintegrating units carried thereby are rotated through the travel of the endless conveyor chains.

The bearings for the shafts 50 are fixed as also the bearings for the shafts 60, but, as it is desirable to effect jarring of the beets as they are carried upwardly by the conveyor, in order to further dislodge any soil which may adhere thereto, means is provided for imparting reciprocatory motion to the frame 62 within the frame 63. This means is clearly illustrated in Figure 6 of the drawings, and it will be observed by reference to this figure that the upper and lower members of the frame 63 are formed with longitudinal slots 77 and that threaded studs 78 are fitted in openings in the top and bottom members of the frame 62 and engage in the slots 77, nuts 79 being fitted to the outer ends of the studs so as to steady the movement of the frame 62.

The invention contemplates the provision of means for imparting a gradual sliding movement to the frame 62 in one direction, laterally, and then permitting a sudden sidewise shifting of the frame and a sudden arresting of its sliding movement, and the means for effecting this movement of the frame 62 comprises a shaft 80 mounted in one end of the frame 63 between the top and bottom members thereof and, fixed upon this shaft are cams 81, each having a gradually curved cam surface 82 receding from the shaft and an abrupt surface 83 at the outer portion of which the surface 82 terminates. Preferably two of these cams are mounted upon the shaft 80 and the cams in the rotation of the shaft ride against rollers 84 which are mounted for free rotation in recesses formed in the adjacent side member of the frame 62. The shaft 80 has mounted at its lower end a bevel gear 85 and a bevel gear 86 upon the shaft 45 meshes with this gear.

In order that the rollers 84 upon the frame 62 may be held in firm engagement with the cams 81, stems 87 are slidably mounted through one side of the frame 63 and are provided at their outer ends with heads 88. Compression springs 89 are arranged upon the stems 87 and bear between the said side member of the frame 63 and the corresponding side member of the frame 62. At this point it will be evident that as the shaft 80 is rotated in the direction indicated by the arrow in Figure 7 of the drawings, the cam surface 82 of each of the cams 81 will ride against the respective rollers 84 and therefore the frame 62 will be gradually shifted toward the right in Figure 6 against the tension of the springs 89. However, as the end of this cam surface 82 of each cam 81 reaches the respective roller 84, the cams will no longer resist shifting movement of the frame 62 and therefore the compression springs 89 will effect a sudden lateral shifting of this frame toward the left in Figure 6. This will cause a jarring of the beets which are between the portions of the stretches of the endless conveyor which are at such time travelling adjacent the frames 62 and 63, and this jarring of the beets will serve to dislodge any particles of soil which have not previously been removed. In order however to cushion the sudden shifting movement of the frame 62 within the frame 63, coiled cushioning springs 90 are mounted upon the stems 87 at the outer side of the member of the frame 63 in which the stems are slidably mounted and are therefore engageable by the heads 88 of the said stems.

From the conveyor, above described, the beets are delivered to two other endless conveyors and, in order that the beets may be guided as they are led to these conveyors, means is provided which will now be described. The numeral 91 indicates in general two conveyor frames each of which includes side members 92 provided at their forward ends with bearings 93 which fit sleeves 94 loosely mounted upon the shaft 45 and the side members 92 of the conveyors 91 are braced at their ends by cross pieces 95. A shaft 96 is rotatably mounted in the rear ends of the side members of the frames 91 and a gear 97 is fixed upon one end of the shaft 96 and meshes with a gear 98 which is mounted upon the corresponding end of the shaft 45. The sprocket gear 46 is provided with a clutch face 99, and a clutch member 100 is splined upon the shaft 45 and is shiftable into and out of engagement with the clutch face 99 of the sprocket gear 46 by means of an angle lever 101 to which is connected a rod 102 leading to an actuating lever 103 which is mounted upon one of the conveyor frames 91, a ratchet 104 being mounted upon the said frame 91 and a pawl 105 being mounted upon the lever 103 coacting with the rack so as to hold the lever in positions of adjustment, and it will be understood at this point that by manipulating the lever 103 the clutch may be shifted so as to shift the clutch into and out of gear with the sprocket gear 46 so that the apparatus, thus far described, may be set in operation or its operation stopped, at the will of one of the men attending the machine. Rolls 108 are fixed upon the shaft 96 and endless belts 109 are trained about these rolls and about other rolls 110 mounted upon the shaft 111 in turn mounted at the rear ends of the two conveyor frames 91. At this point it will be evident that when the shaft is rotated, the upper stretches of the endless conveyors 109 will be caused to travel in a rearward direction and in order that the beets which have been elevated by the elevating endless conveyor, before described, may be directed onto the lower stretches of the conveyors 109, a delivery spout 112 is mounted at the upper end of the first described conveyor, and has its delivery end presented above the conveyors 109 and forwardly converging baffles 113 are mounted at the forward ends of the conveyors 109 and meet at their forward ends between the delivery upper ends of the endless conveyors first described.

Two seats 114 are mounted by brackets 115 at the opposite sides of the conveyor frames 91 and a workman may be seated on each of these seats and the topping mechanism of the machine is mounted between the conveyor frames 91 and between the seats 114 and will now be described.

The numeral 116 indicates a shaft which is mounted for rotation between the adjacent sides of the two conveyor frames 91 and fixed upon this shaft is a circular disk 117 upon the opposite faces of which are mounted blades 118 which extend approximately radially with respect to the shaft 116, and by reference to Figure 8 of the drawings, and the full and dotted line illustration thereof, it will be observed that the blades upon one side of the disk are alternately arranged with respect to those at the other side of the disk. These blades are offset near their attached inner ends as indicated by the numeral 119 with respect to the corresponding faces of the disk 117, and the distance to which these blades are offset as shown in Figures 2 and 3 of the drawings, will be such that when beets, delivered onto the conveyors 109 are picked up by the men occupying the seats 114 and have their tops disposed, against the respective sides of the disk 117 the rotation of the disk will bring one or another of the blades at the respective side of the disk into engagement with the tops to sever the same close to the beets without cutting off any of the beets per se. The shaft 116 has mounted upon it a bevel gear 120 which meshes with the beveled pinion 121 fixed upon the rear end of a shaft 122 which at its forward end has fixed upon it a beveled pinion 123 meshing with the bevel gear 124 upon the shaft 45, rotary motion being in this manner imparted to the disk 117.

As the beets are topped, the men occupying the seats 114, will place the topped beets onto the upper stretch of an endless conveyor 125 which is mounted in a frame 126 having upwardly inclined sides 127. This conveyor has slats 128 projecting from its surface and the conveyor is driven by a sprocket chain 129 trained about a sprocket gear 130 mounted in the bottom of a hopper 131 at one end of the frame 127 and also about a sprocket gear 132 fixed upon the shaft 45.

The upper end of the conveyor frame 127 is supported by the upper ends of the uprights 66 and the said upper end of the conveyor is positioned above the rear side of the top of a receiving hopper 133. This hopper is best shown in Figure 14 of the drawings and comprises a rear wall 134, from the lower edge of which there extends an inclined bottom wall 135. The hopper further comprises a side wall 136 and a side wall 137 and upon this latter side wall there are mounted guides 138 located at opposite sides of an opening 139 in the said wall, a gate 140 being slidably mounted at its vertical edges in these guides and a cable 141 being connected with the said gate and constituting means whereby the gate may be shifted upwardly to open position, thus transmitting the beets which are delivered from the top of the conveyor 125 into the upper end of the chute 142, the lower end of which may be so positioned as to be located above the truck or the like into which the beets are delivered.

The beet tops, as they are separated by the knives 118 from the beets, are permitted to fall upon the upper stretches of the conveyors 109 and a board 143 inclined downwardly and rearwardly, is mounted at the rear ends of the conveyor frames 91, the separated tops being in this manner delivered onto the ground surface in rear of the machine.

The rear ends of the conveyor frames 91 have secured to them stocks 144 in which are swivelled the upper ends of yokes 145 in which ground wheels 146 are rotatably mounted.

Inasmuch as beets are planted in rows or furrows, different distances apart, it is desirable that the lifting blades 28 be capable of relative adjustment as regards the two pairs thereof, and with this end in view, the stocks 26 are held upon the rod 27 by set screws 27' and likewise, the forward ends of the braces 29 are connected with the rod 30 by collars having set screws 29' fitting therethrough and adjustable to bind against the rod 30.

It will be evident that inasmuch as the gear 97 upon the shaft 96 is in mesh with the gear 98 upon the shaft 45, and the frames 91 are swingingly connected with the shaft 96, rotation of the shaft 8 through the medium of the crank handle 11 to effect elevation and lowering of the rear end of the frame 1 of the machine to thereby vary the angle of inclination of the blades 28, will not only result in an upward movement of the frame structure 1 but also an upward swinging movement of the frame structure in which the endless conveyors 109 are mounted, this latter frame structure being however sustained at its rear end by the ground wheels 146.

What I claim is:

1. In a beet harvesting and topping machine, a wheeled frame structure, lifting blades mounted at the front thereof, an elevating conveyor mounted in rear of the blades and inclined upwardly with respect thereto, the said conveyor embodying two endless conveying units, and means for imparting movement to the said units at different rates of speed, whereby beets lifted by the blades will be rotated as they are elevated by the units to disintegrate any soil adhering thereto.

2. In a beet harvesting and topping machine, a wheeled frame structure, lifting blades mounted at the front thereof, an elevating conveyor mounted in rear of the blades and inclined upwardy with respect thereto, the said conveyor embodying two endless conveying units, means for imparting movement to the said units at different rates of speed, whereby beets lifted by the blades will be rotated as they are elevated by the units to disintegrate any soil adhering thereto, and means between the lifting blades and the lower end of the elevating conveyor for maintaining the beets in upright position and guiding them to position between the conveying units.

3. In a beet harvesting and topping machine, a wheeled frame structure, lifting blades mounted at the front thereof, an elevating conveyor mounted in rear of the blades and inclined upwardly with respect thereto, the said conveyor embodying two endless conveying units, means for imparting movement to the said units at different rates of speed, whereby beets lifted by the blades will be rotated as they are elevated by the units to disintegrate any soil adhering thereto, and means between the lifting blades and the lower end of the elevating conveyor for maintaining the beets in upright position and guiding them to position between the conveying units, the said means comprising a rotary shaft, and arms radiating therefrom to engage the beets as they are delivered from the lifting blades.

4. In a beet harvesting and topping machine, a wheeled frame structure, lifting blades mounted at the front thereof, an elevating conveyor mounted in rear of the blades, and inclined upwardly with respect thereto, the said conveyor embodying two endless conveying units, the units having their opposing stretches inclined upwardly in opposite directions, whereby to maintain the beets in upright position, and means for imparting movement to the said units at different rates of speed, whereby beets lifted by the blades will be rotated as they are elevated by the units to disintegrate any soil adhering thereto.

5. In a beet harvesting and topping machine, a wheeled frame structure, lifting blades mounted at the front thereof, an elevating conveyor mounted in rear of the blades and inclined upwardly with respect thereto, the said conveyor embodying two endless conveying units, and means for imparting movement to the said units, the conveyor units being so relatively positioned as to coact with the opposite sides of the beets passing between the same, and means for intermittently imparting jarring impulses to the conveyor units, whereby to jar the beets and effect displacement of soil adhering thereto.

6. In a beet harvesting and topping machine, a wheeled frame structure, lifting blades mounted at the front thereof, an elevating conveyor mounted in rear of the blades and inclined upwardly with respect thereto, the said conveyor embodying two endless conveying units, and means for imparting movement to the said units, the conveyor units being so relatively positioned as to coact with the opposite sides of the beets passing between the same, and means for intermittently imparting jarring impulses to the conveyor units, whereby to jar the beets and effect displacement of soil adhering thereto, the said jarring means comprising a fixed frame, a frame shiftable in the fixed frame, the conveyor units including upper shafts about which the endless conveying means of the units are trained, the shafts being mounted in the shiftable frame, means urging the shiftable frame to one limit of its movement, and rotary cam means coacting with the shiftable frame to intermittently shift the same to the other limit of its movement and then release the same to permit the urging means to suddenly shift the shiftable frame to its first mentioned limit of movement and thereby impart a jarring impulse to the frame and shafts mounted therein to effect jarring of the beets to dislodge soil adhering thereto.

In testimony whereof I affix my signature.

FRED SIEPP.